Oct. 16, 1956  J. B. AYERS  2,766,994
STEERING AND BRAKING MEANS FOR CHILD'S VEHICLE
Filed Oct. 21, 1955
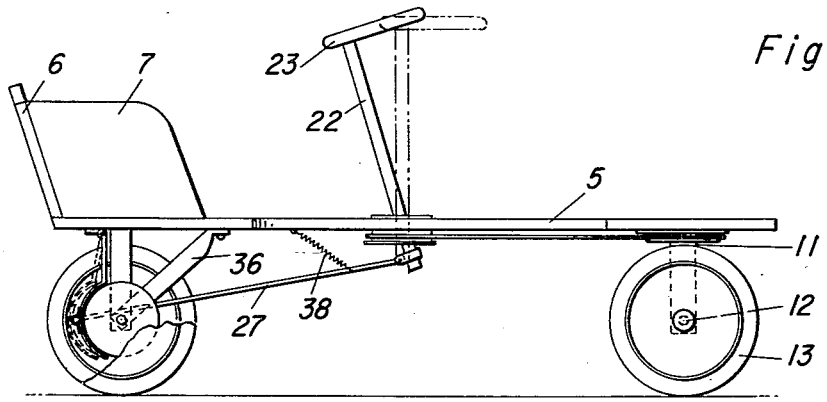
Fig 1
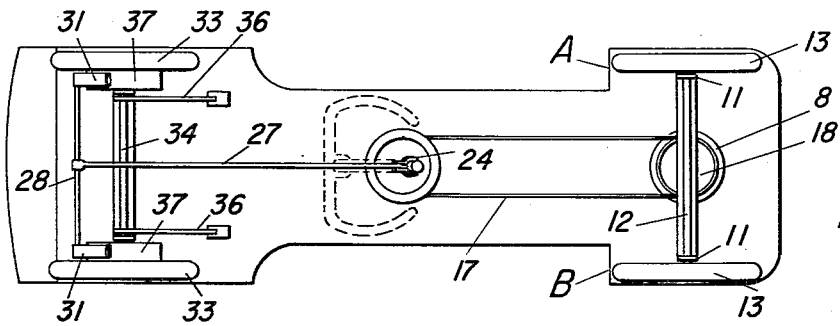
Fig 2
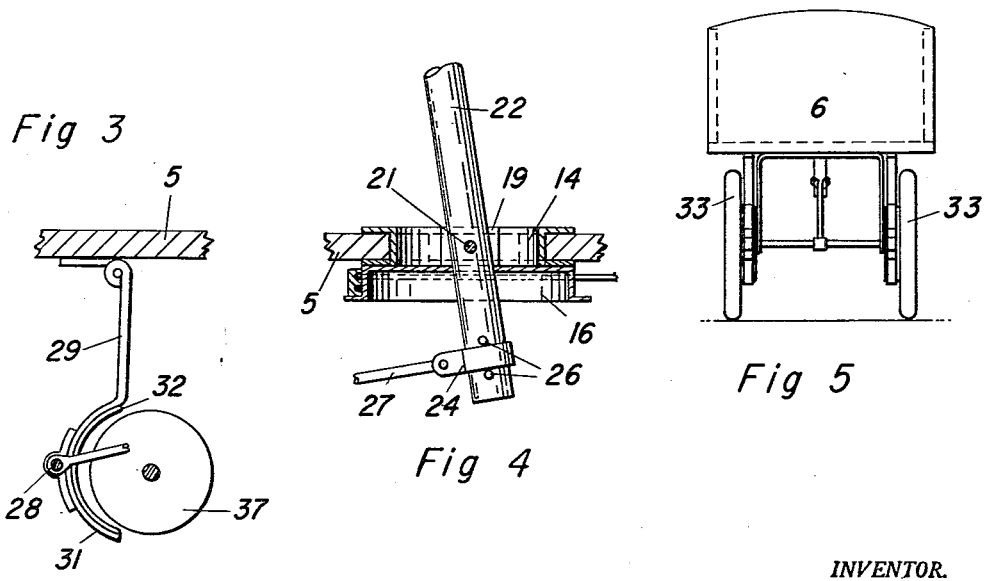
Fig 3
Fig 4
Fig 5
INVENTOR.
James B. Ayers
BY
Att'y

United States Patent Office 2,766,994
Patented Oct. 16, 1956

2,766,994
STEERING AND BRAKING MEANS FOR CHILD'S VEHICLE

James B. Ayers, San Francisco, Calif.

Application October 21, 1955, Serial No. 541,970

1 Claim. (Cl. 280—87.01)

This invention relates to improvements in braking means for a child's vehicle and has particular reference to means for steering and at the same time controlling the braking of the vehicle through the use of a single lever.

A further object of this invention is to produce a child's vehicle which will be safe in that the child through a natural movement tends to apply the brake whenever danger appears to be imminent, thus avoiding serious injury.

A further object is to produce a vehicle which is economical to manufacture and one which is neat in appearance.

Other objects and advantages will be apparent during the course of the following description.

In the accompanying drawings forming a part of this specification and in which like numbers are employed to designate like parts throughout the same, Fig. 1 is a side elevation of my vehicle;

Fig. 2 is a bottom plan view;

Fig. 3 is a fragmentary detailed view of the brake show hanger;

Fig. 4 is a fragmentary detailed view of the combined steering and braking lever; and Fig. 5 is a rear view of Fig. 1.

Children's vehicles are usually controlled through the use of the feet either by pedaling or by pushing on the ground with the feet and usually it is customary to effect a braking of the forward movement of the vehicle by dragging the feet or the bottom of the shoes or the heels on the ground. This action, however, is relatively ineffective when the vehicle is traveling at a high speed. Also, the dragging of the feet causes a very rapid wearing-out of the shoes.

Applicant has therefore devised a vehicle which permits the user of the vehicle to rest his feet against a portion of the vehicle platform and to apply a braking action to the rear wheels by pulling toward himself the steering column. This is a natural action of a child who approaches a dangerous point as the child automatically reacts to withdraw from contact with the object and therefore at the same time will thus apply the brake.

This automatic action also tends to slow down the vehicle when the same begins to go at an excessive rate of speed, as the child will hold back against the forward motion of the vehicle.

In the accompanying drawings, wherein for the purpose of illustration is shown a preferred embodiment of my invention, the numeral 5 designates the platform of the vehicle to which is secured a back rest 6 and side wings 7.

Pivoted beneath the front portion of the platform is a turn-table 8 from which depends a pair of brackets 11, which serve to mount the front axle 12 upon which the wheels 13 rotate.

Substantially midway of the platform is a circular opening formed in the platform and serving to rotatably support a flanged collar 14, to the underside of which flanged collar is secured a drum 16 about which a cable 17 is wound and secured.

The opposite end of the cable passes around a drum 18 secured to the front axle 12. A pair of inwardly extending ears 19 formed on the collar 14 serve to pivotally support, as at 21, a steering column 22 having a steering wheel 23. The lower end of the steering wheel has a collar 24 rotatably supported thereon and held against vertical movement by pins 26.

Pivoted to the collar 24 is a pull rod 27 which is attached to a cross rod 28 which has its free ends pivoted to a hanger 29 pivotally secured to the bottom of the platform 5 and having a curved portion 31 in which is secured a friction brake shoe 32.

The hangers on opposite sides of the vehicle are identical and therefore no further description is necessary.

At 33 I have shown a pair of rear wheels which are mounted upon a rear axle 34 and supported from the platform by brackets 36.

Each one of these wheels carries a brake drum 37 against which the brake shoes 32 are adapted to be moved when braking action is desired.

A spring 38 normally holds the pull rod 27 ready, thus moving the brake shoes out from their brake drums.

The result of this construction is that when the child sits in the seat and places his feet against the portions A and B of the platform, then by rotating the steering wheel, steering action will be transmitted through the cable 17 to the front wheels 13, thus permitting the child to steer the vehicle. Then by moving the steering wheel rearwardly from the dotted line position of Fig. 1 to the full line position, a pull will be exerted on the pull rod 27, it will in turn be transmitted to the cross bar 28 and to both of the hangers, moving the brake bands against their respective brake drums on the rear wheels.

It will thus be seen that the child can thus steer the vehicle and at the same time apply a braking action in the most natural way by pulling toward the body, while pressure of the foot assists the rearward pull.

Thus a very effective braking action will take place.

It will thus be seen that my invention accomplishes all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A braking and steering mechanism for a child's vehicle having a platform and supporting wheels mounted therebelow, the forward wheels of said vehicle being pivoted about a vertical axis, said mechanism comprising a rotatable collar mounted in the platform of said vehicle, a drum secured to said collar, a drum secured to the pivotal mounting of said front axle, a cable extending between said drums so that by rotating said collar said drums will move in unison, a substantially vertical steering column horizontally pivoted in said collar whereby actuation of said column about a vertical axis will rotate said collar, a pair of spaced hangers mounted beneath said platform, each of said hangers having a braking element adapted to engage brake drums formed on the rear wheels of said vehicle, a collar rotatably mounted on the lower end of said column, and a pull link extending between said last mentioned collar, and a horizontal rod pivotally connected to each of said hangers whereby rotation of said steering column about its horizontal axis will effect a movement of said brakes against said drums.

References Cited in the file of this patent

UNITED STATES PATENTS

| | | |
|---|---|---|
| 688,024 | Loomis | Dec. 3, 1901 |
| 797,448 | Metcalf | Aug. 15, 1905 |
| 1,959,229 | Carter | May 15, 1934 |
| 2,713,496 | Ayers | July 19, 1955 |